United States Patent
Collart

(10) Patent No.: US 11,564,140 B2
(45) Date of Patent: Jan. 24, 2023

(54) DEVICE, SYSTEM, AND PROCESS FOR CHANGING NETWORKS FOR WIRELESS DEVICES

(71) Applicant: TracFone Wireless, Inc., Miami, FL (US)

(72) Inventor: Daniel Collart, Miami, FL (US)

(73) Assignee: Tracfone Wireless, nc., Miami, FL (US)

( * ) Notice: Subject to any disclaimer, the term of this patent is extended or adjusted under 35 U.S.C. 154(b) by 0 days.

(21) Appl. No.: 16/015,754

(22) Filed: Jun. 22, 2018

(65) Prior Publication Data

US 2018/0376396 A1    Dec. 27, 2018

Related U.S. Application Data

(60) Provisional application No. 62/523,891, filed on Jun. 23, 2017.

(51) Int. Cl.
*H04W 36/16* (2009.01)
*H04W 36/14* (2009.01)
*H04W 24/04* (2009.01)
*H04W 24/02* (2009.01)

(52) U.S. Cl.
CPC ......... *H04W 36/165* (2013.01); *H04W 24/04* (2013.01); *H04W 36/14* (2013.01); *H04W 24/02* (2013.01)

(58) Field of Classification Search
CPC ... H04W 36/165; H04W 24/04; H04W 36/14; H04W 24/02
See application file for complete search history.

(56) References Cited

U.S. PATENT DOCUMENTS

| | | | |
|---|---|---|---|
| 2007/0030811 A1* | 2/2007 | Frei | H04L 45/00 370/238 |
| 2007/0117593 A1* | 5/2007 | Izdepski | H04W 12/128 455/565 |
| 2008/0039089 A1* | 2/2008 | Berkman | H04W 36/04 455/436 |
| 2008/0247359 A1* | 10/2008 | Bengtsson | H04W 4/16 370/331 |
| 2009/0029703 A1* | 1/2009 | Turnbull | H04W 36/0011 455/414.1 |
| 2010/0017861 A1* | 1/2010 | Krishnaswamy | H04L 29/06 726/7 |

(Continued)

*Primary Examiner* — Christine Ng

(57) ABSTRACT

A process for changing networks for a plurality of wireless devices includes storing in a database current wireless network distribution information for the plurality of wireless devices and storing in the database charge rates for the current wireless network distribution information for the plurality of wireless devices. The process further includes analyzing with the processor the current wireless network distribution information for the plurality of wireless devices and the charge rates for the current wireless network distribution information for the plurality of wireless devices to determine a change in distribution of wireless networks for one or more of the plurality of wireless devices and sending with the processor a command to modify wireless network settings for the one or more of the plurality of wireless devices. A system is disclosed as well.

17 Claims, 7 Drawing Sheets

(56) References Cited

U.S. PATENT DOCUMENTS

| | | | | |
|---|---|---|---|---|
| 2011/0320588 A1* | 12/2011 | Raleigh | ............... | H04W 24/02 |
| | | | | 709/224 |
| 2013/0340059 A1* | 12/2013 | Christopher | ...... | H04M 1/72469 |
| | | | | 726/7 |
| 2014/0094208 A1* | 4/2014 | Egner | ................ | H04L 5/0023 |
| | | | | 455/513 |
| 2014/0101035 A1* | 4/2014 | Tanner | .............. | G06Q 20/3278 |
| | | | | 705/39 |
| 2014/0206338 A1* | 7/2014 | Nishi | ................... | H04W 8/265 |
| | | | | 455/419 |
| 2015/0032495 A1* | 1/2015 | Senarath | ......... | G06Q 10/06313 |
| | | | | 705/7.23 |
| 2015/0105048 A1* | 4/2015 | El Mghazli | ............ | H04W 8/04 |
| | | | | 455/411 |
| 2015/0230165 A1* | 8/2015 | Aminaka | ............. | H04W 48/18 |
| | | | | 455/552.1 |
| 2016/0269888 A1* | 9/2016 | Ljung | ................... | H04W 8/08 |
| 2016/0381660 A1* | 12/2016 | Mittal | ................ | H04W 36/365 |
| | | | | 455/421 |
| 2017/0041864 A1* | 2/2017 | Kalin | ................... | H04W 8/205 |
| 2017/0223599 A1* | 8/2017 | Ho | ....................... | H04W 24/08 |
| 2021/0105626 A1* | 4/2021 | Olshinka | ............ | H04W 12/069 |

\* cited by examiner

DEVICE, SYSTEM, AND PROCESS FOR CHANGING NETWORKS FOR WIRELESS DEVICES

CROSS REFERENCE TO PRIOR APPLICATIONS

This application claims the benefit from U.S. Provisional Application No. 62/523,891 filed on Jun. 23, 2017, which is hereby incorporated by reference in its entirety for all purposes as if fully set forth herein.

BACKGROUND OF THE DISCLOSURE

1. Field of the Disclosure

The disclosure relates to a wireless service provider system and method for changing networks for wireless devices. More particularly, the disclosure relates to systems, devices, and methods for changing networks for wireless devices across multiple networks and wireless carriers. More particularly, the disclosure relates to systems, devices, and methods for changing networks for wireless devices across multiple networks and wireless carriers to optimize wireless network utilization.

2. Related Art

A large number of wireless service plans exist for customers desiring wireless services such as data, talk, text messaging, and the like. The wireless providers of those services typically can only provide services from their own network. Accordingly, modifying which wireless networks and/or wireless carriers a wireless device accesses cannot be accomplished, as there is typically only one network to access.

A need exists to provide a device, system, and method for changing the particular wireless network a wireless device utilizes to achieve the benefits of a particular wireless network.

SUMMARY OF THE DISCLOSURE

The foregoing needs are met, to a great extent, by the disclosure, providing a device, system, and method for changing a network to which wireless devices access.

According to some aspects of the disclosure, a system configured to change networks for a plurality of wireless devices includes a database configured to store current wireless network distribution information for the plurality of wireless devices; the database further configured to store charge rates for the current wireless network distribution information for the plurality of wireless devices; a processor configured to access the database to obtain the current wireless network distribution information for the plurality of wireless devices; the processor further configured to access the database to obtain the charge rates for the current wireless network distribution information for the plurality of wireless devices; the processor further configured to analyze the current wireless network distribution information for the plurality of wireless devices and the charge rates for the current wireless network distribution information for the plurality of wireless devices to determine a change in distribution of wireless networks for one or more of the plurality of wireless devices; and the processor further configured to send a command to modify wireless network settings for the one or more of the plurality of wireless devices.

According to some aspects of the disclosure, a process for changing networks for a plurality of wireless devices includes storing in a database current wireless network distribution information for the plurality of wireless devices; storing in the database charge rates for the current wireless network distribution information for the plurality of wireless devices; accessing with a processor the database to obtain the current wireless network distribution information for the plurality of wireless devices; accessing with the processor the database to obtain the charge rates for the current wireless network distribution information for the plurality of wireless devices; analyzing with the processor the current wireless network distribution information for the plurality of wireless devices and the charge rates for the current wireless network distribution information for the plurality of wireless devices to determine a change in distribution of wireless networks for one or more of the plurality of wireless devices; and sending with the processor a command to modify wireless network settings for the one or more of the plurality of wireless devices.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will also form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

The above mentioned features and aspects of the disclosure will become more apparent with reference to the following description taken in conjunction with the accompanying drawings wherein like reference numerals denote like elements and in which.

DETAILED DESCRIPTION

Figure 1:
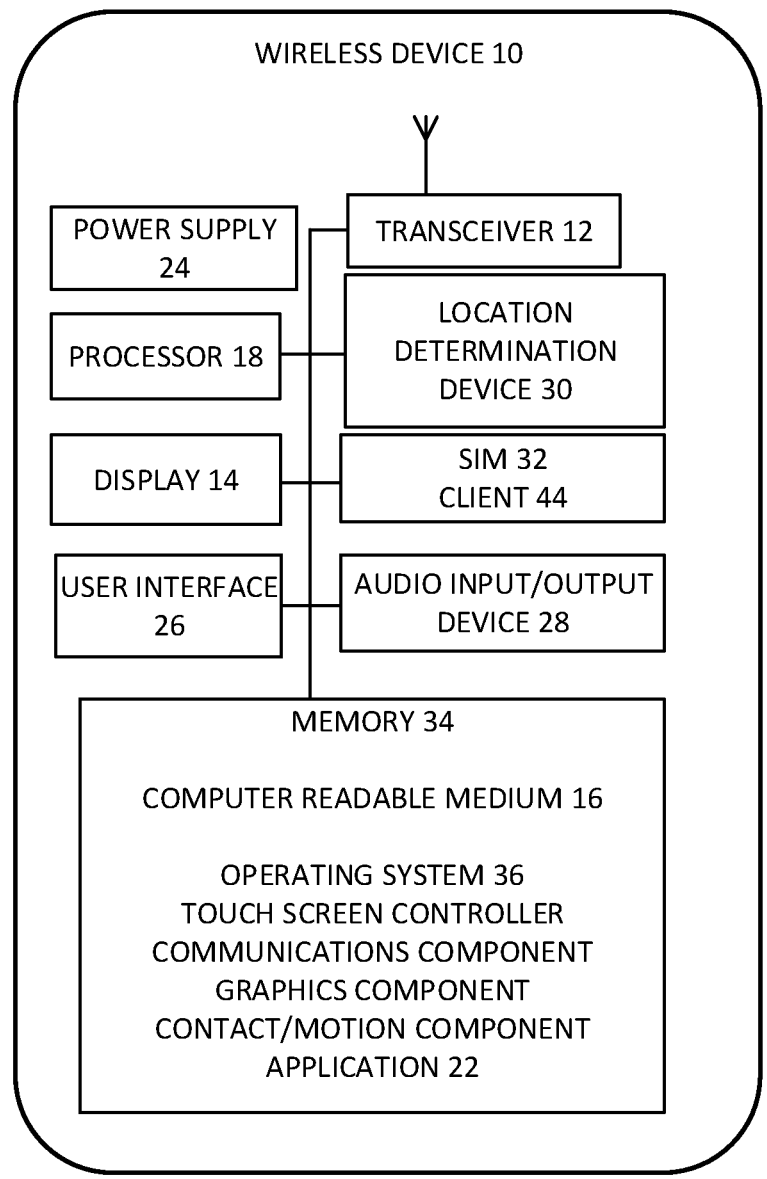
FIG. 1 illustrates an exemplary wireless device and its components, in accordance with aspects of the disclosure.

A large number of wireless service plans exist for customers desiring wireless services such as data, talk, and text messaging. To obtain these wireless services, customers generally have the option of entering into a post-paid service (e.g., contract for a period of time) or a pre-paid, contract-free service. The latter offers customers the freedom to initiate and stop wireless services without incurring expensive cancellation fees associated with a post-paid service.

Generally, companies that provide post-paid wireless services are wireless carriers or Mobile Network Operators (MNO) that maintain and control their own wireless networks. A MNO heavily relies on backend systems to address any provisional, billing, security, and data issues that might threaten the health of their networks. On the other hand, a Mobile Virtual Network Operator (MVNO) is a mobile operator that typically does not own its own frequency spectrum or have its own network infrastructure. MVNOs negotiate and enter into business agreements with third party wireless carriers or MNOs to purchase the right to use their networks for wireless services including volume of data, number of minutes of airtime/voice, and number of text messages used. In this regard, MVNOs may have a plurality of agreements with and the rights to use a plurality of MNO networks.

An MVNO may be able to obtain wireless service from a first particular wireless network implemented by an MNO at a reduced cost in comparison to a wireless service from a second particular wireless network implemented by another MNO. Likewise, an MVNO may be able to obtain additional wireless service from a first particular wireless network implemented by an MNO because the first particular wireless network has a surplus of wireless service in comparison to a wireless service from a second particular wireless network implemented by another MNO. This reduced cost wireless service and/or surplus wireless service may be beneficial to the MVNO and the wireless users of the MVNO. Accordingly, it would be beneficial for the MVNO to have the wireless users of the MVNO access the first wireless network to reduce costs, access surplus wireless service, and the like. Accordingly, an MVNO may be able to offer wireless users a reduced cost for switching from a second MNO network to a first MNO network. Likewise, an MVNO may be able to offer users additional wireless service, indicative of the surplus of wireless service, for switching users from a second MNO network to a first MNO network. Likewise, an MVNO may be able to realize a reduced cost for switching users from a second MNO network to a first MNO network. Likewise, an MVNO may be able to realize additional wireless service, indicative of the surplus of wireless service, for switching users from a second MNO network to a first MNO network.

Convenience, timeliness, cost, service, and reliability of the wireless providers' systems are key factors that play into a user's experience. By developing a system to improve at least these factors, a more positive experience can be provided to the wireless user. The improved experience will help retain customer base and increase the amount of customers willing to purchase wireless services from MVNOs. In order to do so, the following needs can be addressed by a system and method for modifying wireless network access.

In this disclosure and claims it is to be understood that reference to a wireless device is intended to encompass electronic devices such as mobile phones, tablet computers, gaming systems, MP3 players, personal computers, PDAs, and the like. A "wireless device" is intended to encompass any compatible mobile technology computing device that can connect to a wireless communication network, such as mobile phones, mobile equipment, mobile stations, user equipment, cellular phones, smartphones, handsets, or the like (e.g., Apple iPhone, Google Android based devices, BlackBerry based devices, other types of PDAs or smartphones), wireless dongles, remote alert devices, Internet of things (IoT) based wireless devices, or other mobile computing devices that may be supported by a wireless network. The term "wireless device" may be interchangeably used and referred to herein as "wireless handset," "handset," "mobile device," "device," "mobile phones," "mobile equipment," "mobile station," "user equipment," "cellular phone," "smartphones," "monitoring device" or "phone."

Wireless devices may connect to a "wireless network" or "network" and are intended to encompass any type of wireless network to obtain or provide mobile phone services through the use of a wireless device, such as the Global System for Mobile Communication (GSM) network, Code-Division Multiple Access (CDMA) network, Long-Term Evolution (LTE) network, 4G, 5G, a Wi-Fi network, a network implementing a communication channel as defined herein, and the like that may utilize the teachings of the disclosure.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described, which may be requirements for some aspects but not for other aspects.

FIG. 1 illustrates an exemplary wireless device and its components, in accordance with aspects of the disclosure. In particular, FIG. 1 illustrates an exemplary wireless device 10. The wireless device 10 may include a transceiver 12, a display 14, a computer readable medium 16, a processor 18, and an application 22. The transceiver 12 can include, for example, a wireless antenna and associated circuitry capable of data transmission with a mobile data network utilizing at least one data transmission protocol, such as, for example, 3G, 4G Long Term Evolution (LTE), 5G, Evolution-Data Optimized (EVDO), Code Division Multiple Access (CDMA), High Speed Packet Access (HSPA), Global System for Mobile Communications (GSM), W-CDMA (Wideband Code-Division Multiple Access), Wi-Fi, Bluetooth, a communication channel as defined herein, combinations thereof, and/or the like. The transceiver 12 may transmit and receive data utilizing the data transmission protocol. Moreover, the transceiver 12 may provide voice and text message capabilities. In one aspect, the processor 18 and/or the transceiver 12 may be implemented in a wireless device chipset.

The display 14 of the wireless device 10 may be configured to display various information provided to the display 14 from the processor 18 of the wireless device 10, computer readable medium 16, or an application 22. The screen may be a light-emitting diode display (LED), an electroluminescent display (ELD), a plasma display panel (PDP), a liquid crystal display (LCD), an organic light-emitting diode display (OLED), an active-matrix organic light-emitting diode (AMOLED) display, an IPS (In-plane switching) liquid crystal display (LCD), or any other display technology.

The displayed information can include, for example, the amount of prepaid wireless data service available, the network connection strength, the type of mobile network data connection (such as 3G, 4G LTE, EVDO, Wi-Fi, etc.) the wireless device 10 is connected to, and/or other information potentially useful to the user. The information may be displayed simultaneously or the user may interact with an input device such as buttons on the wireless device 10 or, if the display 14 is a touch-screen, with the icons on the display 14 to cycle through the various types of information for display. For example, the display 14 may present the amount of prepaid wireless data service available, the network connection strength, and the type of mobile network data connection simultaneously. Alternatively, the display 14 may only present one type of information, for example, the amount of prepaid wireless data service available. The display 14 may then present other types of information if the user interacts with buttons on the wireless device 10 or, if the display is a touch-screen, with icons on the display 14.

The computer readable medium 16 may be configured to store the application 22. For the purposes of this disclosure, computer readable medium 16 stores computer data, which may include computer program code that may be executable by the processor 18 of the wireless device 10 in machine readable form. By way of example, and not limitation, the computer readable medium 16 may include computer readable storage media, for example tangible or fixed storage of data, or communication media for transient interpretation of code-containing signals. Computer readable storage media, as used herein, refers to non-transitory physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable medium 16 or machine readable medium, which may be incorporated into a computer program product. The computer readable medium 16 may also store information such as the amount of data used for each domain, web address, wireless device 10 programs, or other web resource during a given time period, such as, for example, one billing cycle. Other performance data may also be stored on the computer readable medium 16.

Additionally, the computer readable medium 16 may communicate to or present on the display 14 the various metrics described above. Similarly, the computer readable medium 16 may also communicate to or display on the display 14 the amount of data sent and received. Moreover, the computer readable medium 16 may communicate to or display on the display 14 the amount of data that may be remaining from the previously purchased and/or credited amount of data. Other performance data may also be presented on the display 14.

The processor 18 may be configured to execute the application 22. The processor 18 can be, for example, dedicated hardware as defined herein, a computing device as defined herein, a processor, a wireless device processor, a microprocessor, a wireless device chipset, a central processing unit (CPU), a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute the application 22.

Additionally, the processor 18 may communicate to or present on the display 14 the various metrics described above. For example, the processor 18 may communicate to or present on the display 14 the amount of data used. Similarly, the processor 18 may also communicate to or present on the display 14 the amount of data sent and received and at which data speed. Moreover, the processor 18 may communicate to or present on the display 14 the amount of data that may be remaining from the previously purchased and/or credited amount of data.

The wireless device 10 may also have a power supply 24. The power supply 24 may be a battery such as nickel cadmium, nickel metal hydride, lead acid, lithium ion, lithium ion polymer, and the like. The wireless device 10 may also include a memory 34, which could be internal memory or a removable storage type such as a memory chip. The memory 34 may store information about the wireless device 10, including wireless profiles and settings. Additionally, the wireless device 10 may include an audio input/output device 28 for the input or output of sounds in videos, music, and the like.

The wireless device 10 may use a subscriber identity module (SIM) card 32. The SIM 32 may vary in size and may be a micro, mini, nano size, or any size SIM 32. The SIM 32 may be associated with a client 44, which may manage SIMs 32 to control which wireless networks the wireless device 10 may connect. The SIM 32 may store network-specific information used to authenticate and identify subscribers on the network including one or more of an integrated circuit card identifier (ICCID), International Mobile Subscriber Identity (IMSI), Authentication Key (Ki), Local Area Identity (LAI), Operator-Specific Emergency Number, and/or the like. The SIM 32 may also store other carrier-specific data such as the SMSC (Short Message Service Center) number, Service Provider Name (SPN), Service Dialing Numbers (SDN), Advice-Of-Charge parameters, Value Added Service (VAS) applications, and/or the like. The SIM 32 may be identified by its ICCID. ICCIDs may be stored in the SIM cards. The ICCID is defined by the ITU-T recommendation E.118 as the Primary Account Number. The SIM 32 layout may be based on ISO/IEC 7812. In some aspects, the SIM 32 may also be a soft SIM, electronic SIM, or embedded SIM. In some aspects, other memory locations of the wireless device 10 may store carrier-specific data such as the International Mobile Subscriber Identity (IMSI), Authentication Key (Ki), Local Area Identity (LAI), Operator-Specific Emergency Number, the SMSC (Short Message Service Center) number, Service Provider Name (SPN), Service Dialing Numbers (SDN), Advice-Of-Charge parameters, Value Added Service (VAS) applications, and/or the like.

The wireless device 10 may also have a user interface 26 to facilitate use of the wireless device 10 with an operating system 36. The operating system 36 may be associated with a touchscreen controller, one or more communications components, one or more graphics components, one or more contact/motion components, and the like.

According to another aspect of the disclosure, the wireless device 10 and/or a network 200 may estimate the location of the wireless device 10 based, at least in part, on a global navigation satellite system (GNSS) with the location determination device 30. In another aspect, a network 200 may secure location determination based on a specific cell in which the wireless device 10 connects. In yet another aspect, a network 200 may obtain location determination based on triangulation with respect to a plurality of cells in which the wireless device 10 receives signals. Each of these approaches may be implemented with a location determination device 30.

One or more of the applications 22 may be stored and executed on the wireless device 10. The application 22 may be an electronic application or software application configured to track prepaid data usage and the remaining amount of prepaid data available. The application 22 may be written in any programming language, such as, for example, C, Java, Objective-C, C+, Python, Visual Basic, Perl, or any other programming language the processor 18 is capable of executing. The application 22 may also meter how much data has been used on a given domain, web address, wireless device application, or other web resource, and the like of the wireless device 10 on each network 200 that the wireless device 10 has used.

Additionally, the application 22 may communicate to or present on the display 14 the various metrics described above. For example, the application 22 may communicate to or present on the display 14 the amount of data used and at what data speed. Similarly, the application 22 may also communicate to or present on the display 14 the amount of data sent and received. Moreover, the application 22 may communicate to or present on the display 14 the amount of data that may be remaining from the previously purchased and/or credited amount of data associated with the MVNO account.

The application 22 may be made available by a MVNO cloud 252, may be downloaded by the wireless device 10 from the MVNO cloud 252, may be stored on a chipset, the SIM 32 of the wireless device 10, stored in the memory 34, or may be part of the system bios of the wireless device 10.

The application 22 described in the disclosure may be implemented to execute on an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. The application may be displayed as an icon. The application may have been downloaded from the Internet, pre-installed, or the like. In some aspects, the application may be obtained from Google Play™, Android Market™, Apple Store™, or the like digital distribution source. The application may be written in conjunction with the software developers kit (SDK) associated with an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system, or the like.

In a particular aspect, the application 22 may be configured to modify a network to which the wireless device 10 connects by modifying network settings. In one aspect, the application 22 may be configured to modify a network to which the wireless device 10 connects by modifying network settings of the SIM 32. The processor 18 and/or the application 22 on the wireless device 10 may modify the network settings on the wireless device 10 so that the wireless device 10 connects to a particular network 200 based on a variety of factors such as time, location, type of wireless device 10 use, cost, MVNO preference, and the like. For example, an MVNO may be able to obtain wireless service from a first particular wireless network implemented by an MNO at a reduced cost in comparison to a wireless service from a second particular wireless network implemented by another MNO. Likewise, an MVNO may be able to obtain additional wireless service from a first particular wireless network implemented by an MNO because the first particular wireless network has a surplus of wireless service in comparison to a wireless service from a second particular wireless network implemented by another MNO. This reduced cost wireless service and/or surplus wireless service may be beneficial to the MVNO and the wireless users of the MVNO. Accordingly, it would be beneficial for the MVNO to have the wireless users of the MVNO access the first wireless network to reduce costs, access surplus wireless service, and the like. Accordingly, an MVNO may be able to offer wireless users a reduced cost for switching from a second MNO network to a first MNO network. Likewise, an MVNO may be able to offer users additional wireless service, indicative of the surplus of wireless service, for switching users from a second MNO network to a first MNO network. Likewise, an MVNO may be able to realize a reduced cost for switching users from a second MNO network to a first MNO network. Likewise, an MVNO may be able to realize additional wireless service, indicative of the surplus of wireless service, for switching users from a second MNO network to a first MNO network.

In one aspect, the application 22 may modify network settings on the wireless device 10 with the processor 18 and/or the application 22 in response to instructions from a processor 250 in a MVNO cloud 252. In one aspect, the processor 250 may be implemented with a server. Alternatively or additionally, modifying the network settings in the wireless device 10 may include using the processor 18 and/or the application 22 to provide an option to the user of the wireless device 10 to have the processor 18 and/or the application 22 modify the network settings. In one aspect, the option to modify the network settings may include text on the wireless device 10, including visually presenting an option on the display 14. For example, receiving a notification generated by the application 22 offering network modification and an affirmative response to the notification initiating modification of the network settings. In one aspect, the option to modify the network settings may include an interactive voice response system implemented by the MVNO cloud 252. For example, receiving an automated phone call offering network modification and an interactive voice response reply in the affirmative to the phone call initiating modification of the network settings. In one aspect, the option to modify the network settings may include an interactive text response system implemented by the MVNO cloud 252. For example, receiving a text message offering network modification and a reply in the affirmative to the text initiating modification of the network settings.

Figure 2:
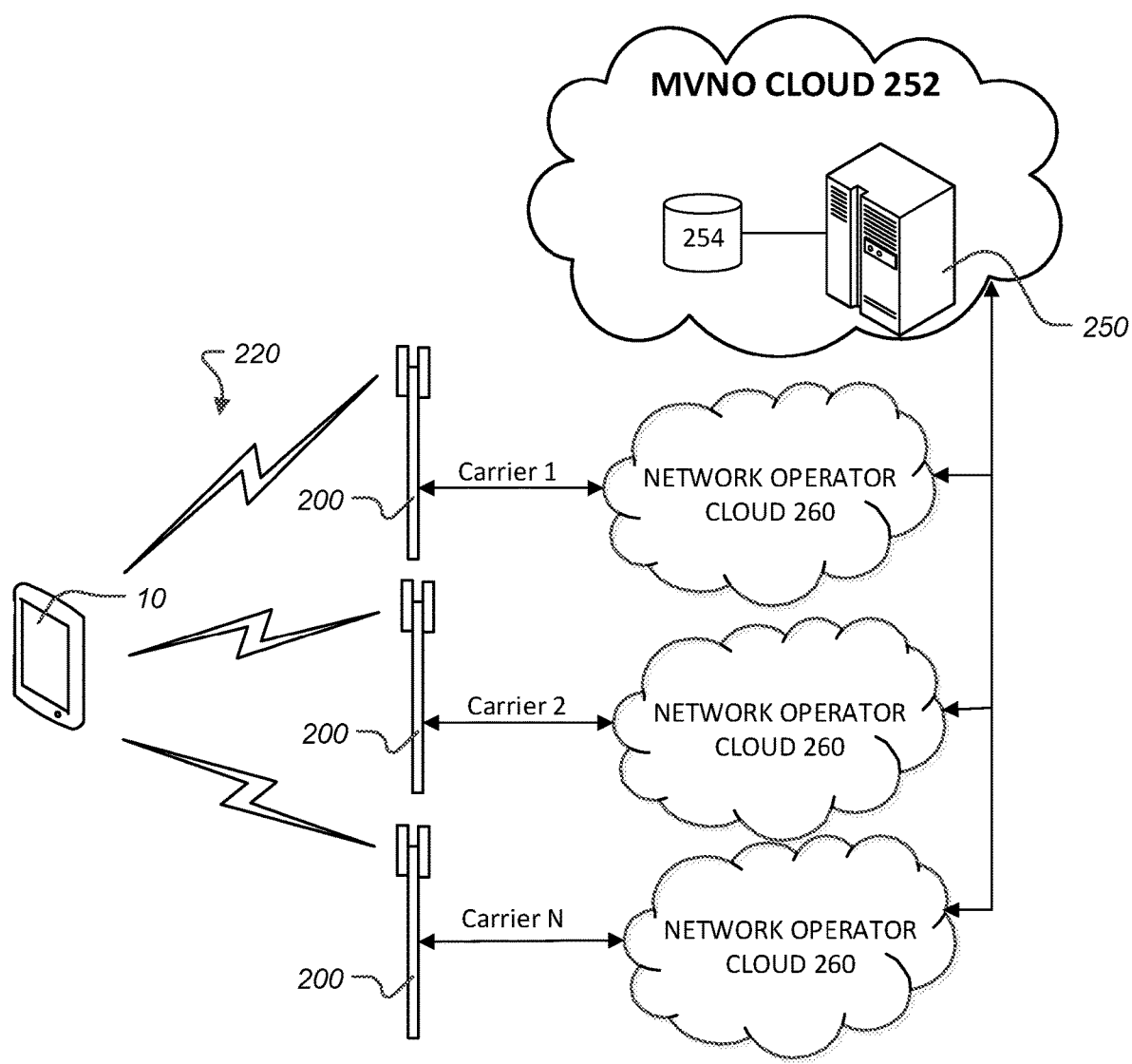
FIG. 2 illustrates a system in which a wireless device may connect with one of a plurality of networks and service providers, in accordance with aspects of the disclosure.

FIG. 2 illustrates a system in which a wireless device may connect with one of a plurality of networks and service providers, in accordance with aspects of the disclosure. In particular, FIG. 2 illustrates possible connections between the wireless device 10, a network 200, and/or the MVNO cloud 252. More than one network 200 may be available to the wireless device 10 at a given time and/or location and based on the type of service desired for use of the wireless device 10. The type of service provided by the network 200 may include data, voice, SMS, and the like.

The variety of available carriers associated with one or more networks 200 are represented in FIG. 2 by carrier 1, carrier 2, . . . carrier N. Where N is a positive integer. In other words, there may be N different networks or carriers. A network 200 may have its own subscriber profile repository (not shown) which can verify a wireless user account associated with the wireless device 10. When the wireless device 10 has been authenticated on a network 200, the wireless device 10 may connect to a gateway support node (not shown) associated with the network 200 to receive wireless services including data, voice, and text, and/or other wireless services available to the wireless device 10 on the network 200. The gateway support node may also operatively link the wireless device 10 to communicate billing and policy services associated with the network 200.

The network modification process may be performed at least in part by the MVNO cloud 252, which may employ the processor 250 to receive and store wireless user data. The MVNO cloud 252, which may contain one or more processors, may determine that one or more wireless users would benefit from changing or modifying networks. Thereafter, the MVNO cloud 252 may implement changes to the network settings for the wireless device 10.

Modifying network settings by the MVNO cloud 252 for the wireless device 10 may include establishing a user profile and/or a general profile, each profile possibly based at least in part on a geographic location of the wireless device 10 and/or other factors such as type of wireless device 10 use. The profile data may be stored in a database 254. The MVNO cloud 252 may modify network settings based on factors such as location, and may transmit those settings to the wireless device 10. In one example, at a particular time and/or location, the MVNO cloud 252 may transmit to the wireless device 10 network modification settings and/or profiles to implement on the wireless device 10. The wireless device 10 may receive those network modification settings from the MVNO cloud 252 through a connection to the network 200, which may connect to the MVNO cloud 252 via a Network Operator Cloud 260, and may implement those network modification settings on the wireless device 10. The wireless device 10 may automatically implement the network modification settings and/or profiles on the wireless device 10, or may provide an option to the user to implement the settings and/or profiles on the wireless device 10.

Figure 3:
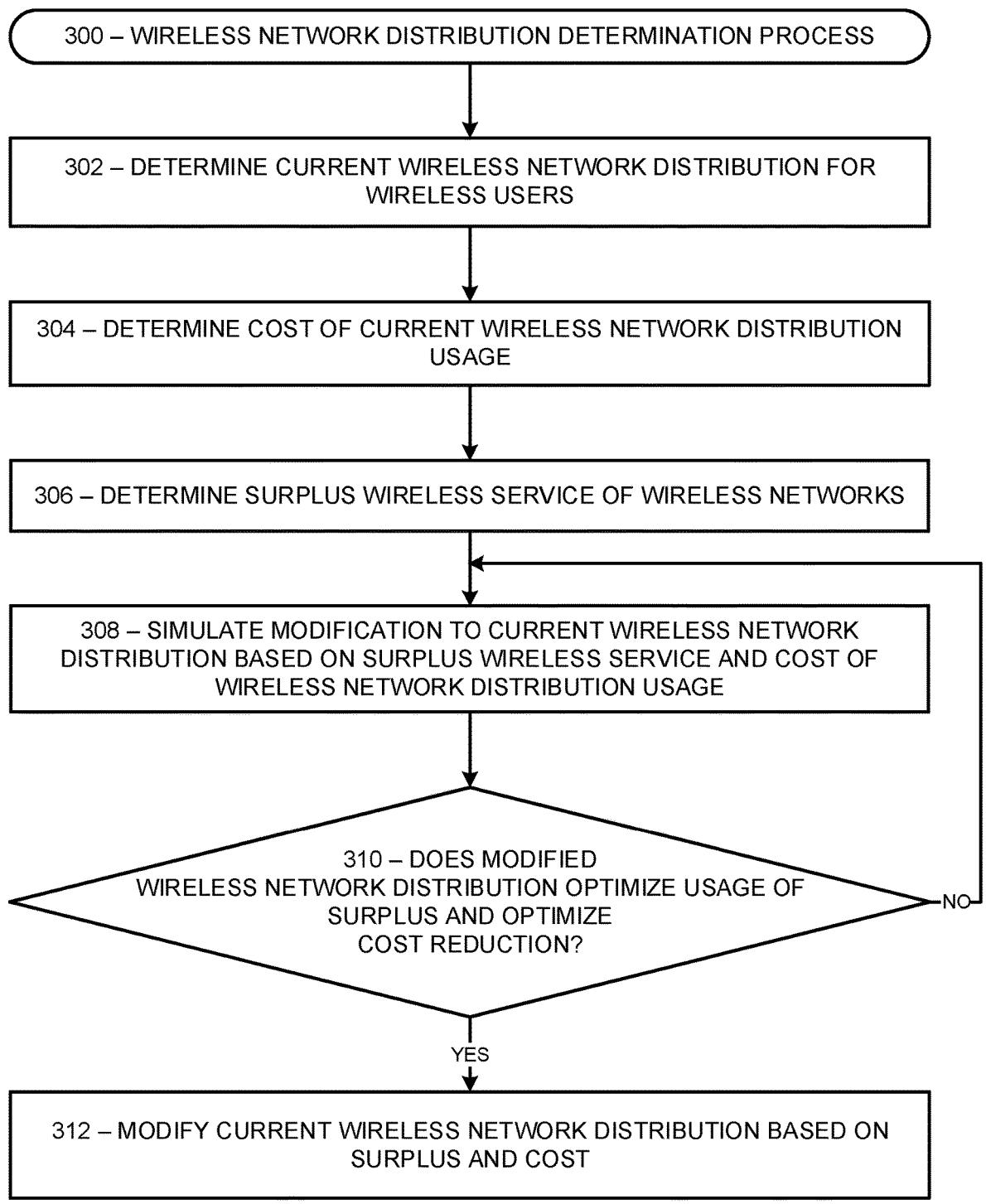
FIG. 3 illustrates a process for determination of a wireless network for wireless devices, in accordance with aspects of the disclosure.

FIG. 3 illustrates a process for determination of a wireless network for wireless devices, in accordance with aspects of the disclosure. In particular, FIG. 3 illustrates a wireless network distribution process 300 that may allow an MVNO to make a determination on whether one or more wireless devices should connect to a different wireless network. The process 300 may be implemented by the MVNO cloud 252, the processor 250, and/or other processors.

In box 302, the process 300 may determine current wireless network distribution for wireless users that are overseen by the MVNO. The current wireless network distribution for wireless users may be stored in the database 254 associated with the MVNO cloud 252, the processor 250, and/or other processors. Additionally, the current wireless network distribution for wireless users may further store a general location of the wireless users based on a location determination device or other information. Moreover, the current wireless network distribution for wireless users may further store a type of wireless service used by the wireless users. Other detailed information of the wireless users may also be stored in the database 254 of the MVNO cloud 252 in order to allow the process of wireless network distribution for wireless users is optimized.

In box 304, the process 300 may determine cost or charge rate of current wireless network distribution usage. The cost of current wireless networks may be stored in the database 254 associated with the MVNO cloud 252, the processor 250, and/or other processors. This cost may be applied to the current wireless network distribution for wireless users and may be stored in the database 254 associated with the MVNO cloud 252, the processor 250, and/or other processors. For example, if N users are accessing a first wireless network at a cost of X, then the cost will be NX; if M users are accessing a second wireless network at a cost of Y, then the cost will be MY; and so on. Additional factors affecting the cost of the current wireless networks may be factored into the determination as well. For example, there may be certain cost savings and/or cost increases for assigning wireless users to particular MNO networks. Each of these factors may be updated based on the current location of the wireless user, amounts of data, voice, and text wireless services used by each of the wireless users, the amount of wireless service each of the MNO networks/carriers provide to the MVNO and the like. In one aspect, the cost of current wireless network distribution may include a determination of the future costs of current wireless network distribution. In one aspect, the future costs may be statistically determined based on historical information stored in the database 254. In one aspect, the future costs may be statistically determined utilizing artificial intelligence based on the information stored in the database 254. The artificial intelligence may utilize any number of approaches including one or more of cybernetics and brain simulation, symbolic, cognitive simulation, logic-based, anti-logic, knowledge-based, sub-symbolic, embodied intelligence, computational intelligence and soft computing, machine learning and statistics, and the like.

In box 306, the process 300 may determine whether there is a surplus wireless service in one or more of the wireless networks 200. In this regard, it may be determined from the usage information that there is a surplus of wireless service in one or more of the wireless networks 200. Alternatively or additionally, one or more of the wireless network 200 may provide additional wireless service (surplus wireless service) to the MVNO for use by the wireless users of the MVNO.

In box 308, the process 300 may simulate modification to current wireless network distribution based on the surplus wireless service and the cost of wireless network distribution usage. In other words, the process 300 may simulate modifying the current network distribution based on the information noted above including cost, surplus wireless service, wireless user location, historical type of wireless service used, and the like to determine if modification of the current wireless network distribution may be advantageous. The simulation may be repeated numerous times while adjusting wireless user distribution in order to ascertain the best benefits to the wireless users and the MVNO. The benefits may be increased service to the wireless users, reduced cost, and the like.

In box 310, the process 300 may determine whether a simulated modified wireless network distribution optimizes usage of surplus and/or optimizes a cost reduction of wireless service. The determination may be repeated as noted above in order to ascertain the best benefits to the wireless users and the MVNO. Once the optimal wireless distribution has been determined, the process 300 advances to box 312.

In another aspect, the functionality of box 308 and box 310 in the process 300 may determine modifications to current wireless network distribution based on the surplus wireless service and the cost of wireless network distribution usage without simulation. In other words, the process 300 may determine modifying the current network distribution based on the information noted above including cost, surplus wireless service, wireless user location, historical type of wireless service used, and the like to determine if modification of the current wireless network distribution may be advantageous. The determination may be based on cost algorithms that provide insight into adjusting wireless user distribution in order to ascertain the best benefits to the wireless users and the MVNO. More specifically, the algorithm may be a function and the function may determine an overall cost based on a cost for each wireless device, the amount of surplus wireless service, wireless user locations, historical type of wireless service used, and the like. The benefits may be increased service to the wireless users, reduced cost, and the like.

In box 312, the process may modify current wireless network distribution based on surplus wireless service and cost of wireless service. In this regard, the MVNO cloud 252, the processor 250, and/or other processors may command that one or more wireless devices be modified to have a new network distribution. Alternatively or additionally, the MVNO cloud 252, the processor 250, and/or other processors may request that wireless users allow their wireless devices be modified to have a new network distribution. This process is detailed below.

Figure 4:
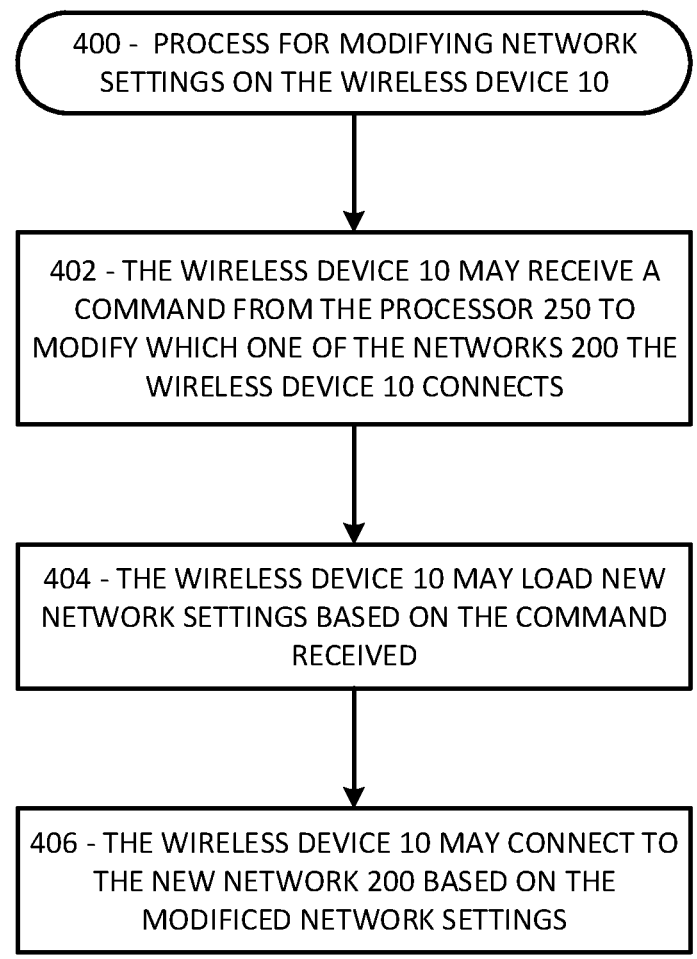
FIG. 4 illustrates a process for modifying wireless network access for a wireless device, in accordance with aspects of the disclosure.

FIG. 4 illustrates a process for optimizing wireless network access for a wireless device, in accordance with aspects of the disclosure. FIG. 4 illustrates a process 400 for modifying network settings on the wireless device 10 using the wireless device 10 once the network modification settings have been determined and have been received by the wireless device 10.

Starting at box 402, the wireless device 10 may receive a command from the processor 250 to modify which one of the networks 200 the wireless device 10 connects. The command from the processor 250 may be any type of communication that the application 22 or the wireless device 10 is responsive. For example, the command may be an over the air (OTA) communication, an application push, an application pull, SMS communication, or the like. For example, the command may be an over-the-air service provisioning (OTASP), over-the-air provisioning (OTAP), over-the-air parameter administration (OTAPA), or the like provisioning of the necessary network settings with which to access services from a desired network 200.

The application 22 may be configured as a provisioning client capable of receiving, processing and setting the parameters associated with modifying a network. For example, the application 22 may be a Device Management client capable of receiving and provisioning applications, connectivity parameters, or the like. In general, the term OTA implies the use of wireless mechanisms to send provisioning data or update packages for firmware or software updates to the wireless device 10 to modify network settings.

The process 400 may continue to box 404 where the wireless device 10 may load the new network settings based on the command received at box 402. The network settings may be based on the profiles generated by the MVNO cloud 252. The network settings may also be based on the location and/or time of the wireless device 10, and/or based on the type of use of the wireless device 10 is desired.

Next the process 400 may proceed to box 406 where the wireless device 10 may connect to the new network 200 based on the modification settings loaded by the wireless device 10 at box 404.

Figure 5:
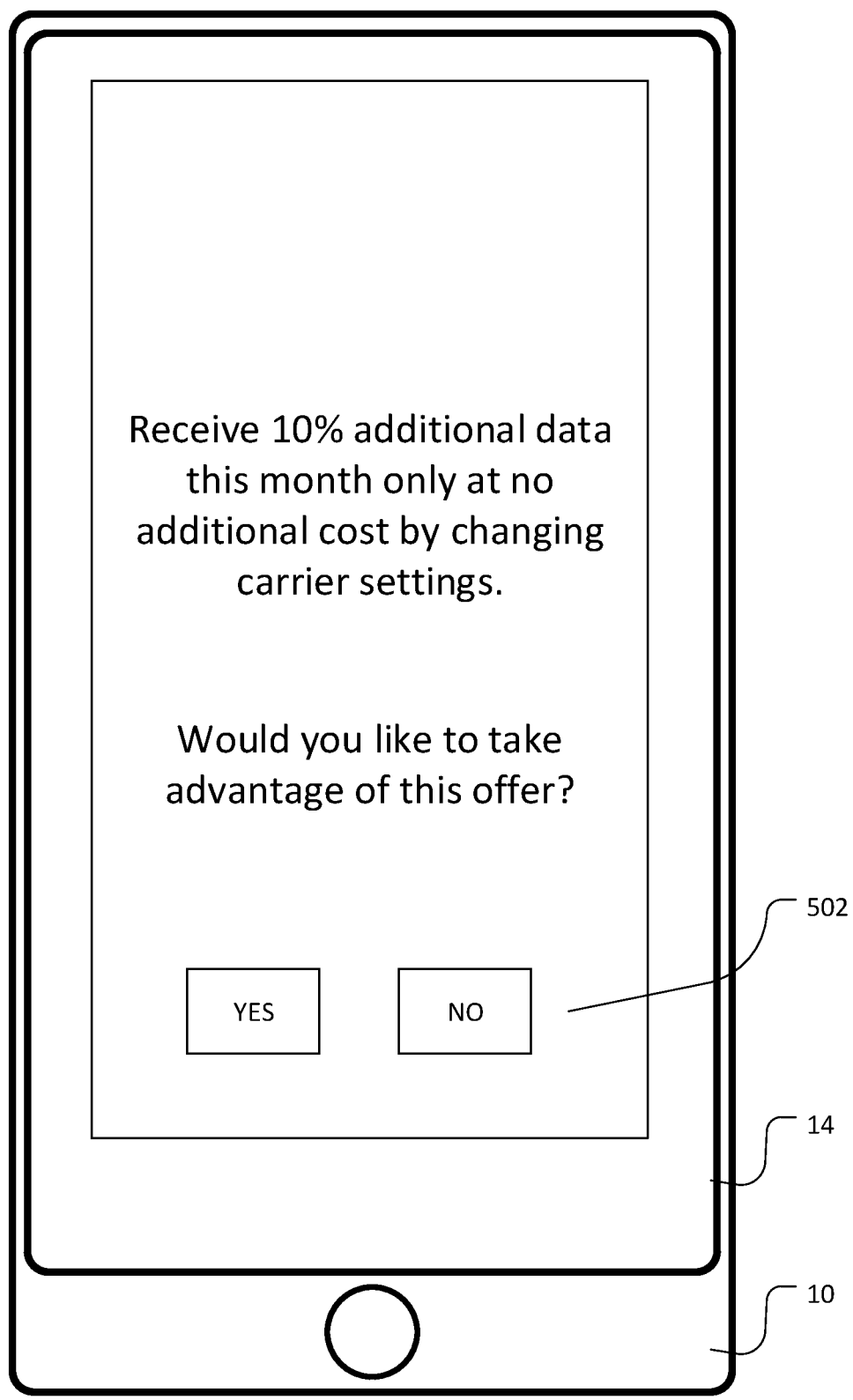
FIG. 5 illustrates an exemplary notification for requesting modification of wireless network access for a wireless device, in accordance with aspects of the disclosure.

FIG. 5 illustrates an exemplary notification for requesting modification of wireless network access for a wireless device, in accordance with aspects of the disclosure. In one aspect, the option to modify the network settings may include a notification 502 on the wireless device 10, including visually presenting an option on the display 14. For example, receiving a notification 502 generated by the application 22 offering network modification and an affirmative response to the notification initiating modification of the network settings.

In one aspect, the processor 250 may determine that a particular wireless device 10 may benefit from changing networks. Accordingly, the processor 250 may send a notification to a particular wireless device 10 over the network 200. The wireless device 10 may receive the notification from the processor 250. The application 22 may generate the notification 502 on the display 14. The notification 502 may include one or more interactive graphical user interface buttons to receive a response from the wireless user. Once the application receives the response from the wireless user, the application 22 may send a responsive communication to the processor 250. Thereafter, the processor 250 may implement the process 400 illustrated in FIG. 4.

Figure 6:
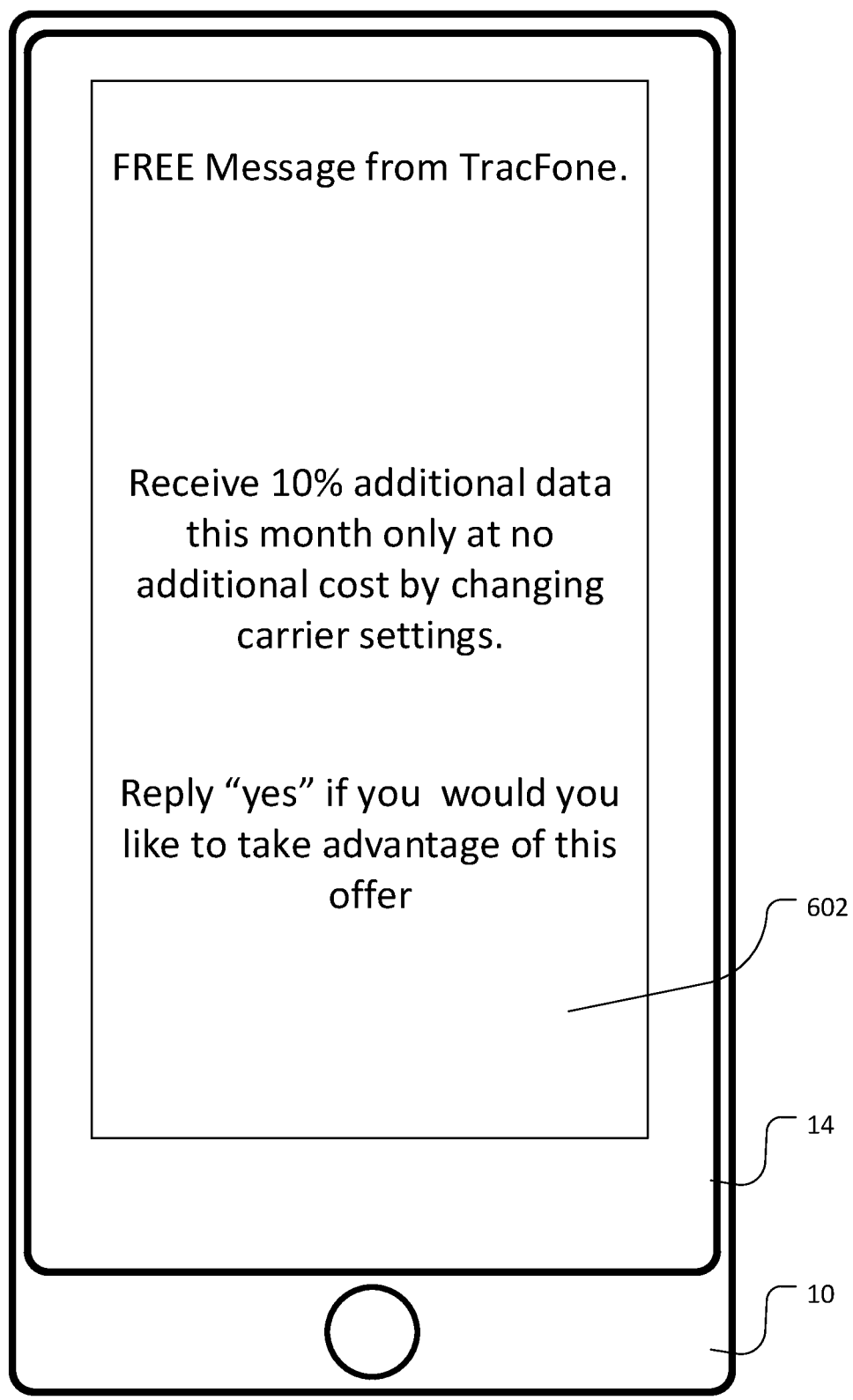
FIG. 6 illustrates an exemplary text for requesting modification of wireless network access for a wireless device, in accordance with aspects of the disclosure.

FIG. 6 illustrates an exemplary text for requesting modification of wireless network access for a wireless device, in accordance with aspects of the disclosure. In one aspect, the option to modify the network settings may include an interactive text response system implemented by the MVNO cloud 252. For example, receiving a text message 602 offering network modification and a reply in the affirmative to the text 602 initiating modification of the network settings.

In one aspect, the processor 250 may determine that a particular wireless device 10 may benefit from changing networks. Accordingly, the processor 250 may send an SMS to a particular wireless device 10 over the network 200. The wireless device 10 may receive the SMS from the processor 250. The wireless device may display the SMS in a text messaging application on the display 14 of the wireless device. The SMS 602 may include instructions for the wireless user to respond to the processor 250 via an SMS reply. Once the processor 250 receives the responsive SMS from the wireless user, the processor 250 may implement the process 400 illustrated in FIG. 4.

Figure 7:
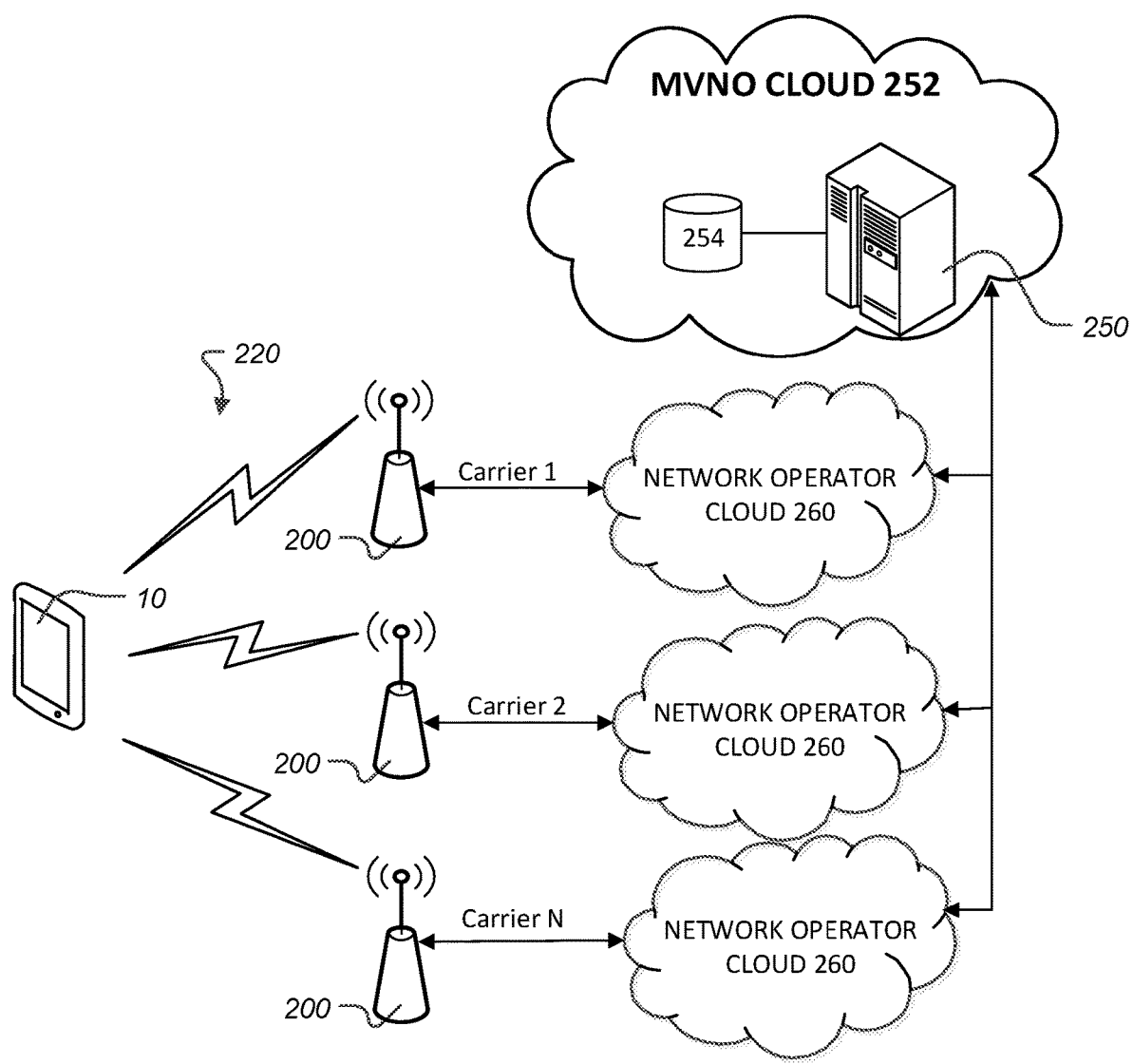
FIG. 7 illustrates a system in which a wireless device may connect with one of a plurality of networks and service providers, in accordance with aspects of the disclosure.

FIG. 7 illustrates a system in which a wireless device may connect with one of a plurality of networks and service providers, in accordance with aspects of the disclosure. In some aspects, as shown in FIG. 2, the networks 200 may be a mobile wireless network. However, in other aspects as illustrated in FIG. 7, the networks 200 may be Wi-Fi networks. In such aspects, the above described process and system may be modified consistent with a Wi-Fi implementation. In yet further aspects, the networks 200 may include both mobile wireless networks and Wi-Fi networks. In such aspects, the above described process and system may be modified consistent with a dual mobile wireless network and Wi-Fi implementation.

Thus, a device, system, and method for providing modifying a network to which a wireless device receives wireless service across multiple networks has been disclosed. The disclosed subject matter may allow wireless providers to modify network settings for wireless device users based on a variety of data associated with the use of wireless devices on multiple networks. The optimization of wireless services across multiple wireless networks and carriers may reduce costs. The optimization of wireless services across multiple wireless networks and carriers may improve the experience of users of wireless service plans that allow wireless service across multiple networks.

Further in accordance with various aspects of the disclosure, the methods described herein are intended for operation with dedicated hardware implementations including, but not limited to processors, microprocessors, wireless device chipsets, PCs, PDAs, SIM cards, semiconductors, application specific integrated circuits (ASIC), programmable logic arrays, cloud computing devices, and other hardware devices constructed to implement the methods described herein.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may include, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

The disclosure may include communication channels 220 that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), EVolution-Data Optimized (EVDO), 4G, 5G, and/or the like, and/or a combination of two or more thereof.

The disclosure may be implemented in any type of computing devices or processor, such as, e.g., a microprocessor, wireless device chipset, a desktop computer, personal computer, a laptop/mobile computer, a personal data assistant (PDA), a mobile phone, a tablet computer, cloud computing device, and the like, with wired/wireless communications capabilities via the communication channels 220.

In an aspect, the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

The term text, text message, or SMS refers to "short message service" which is a text messaging service component of phone, web, or mobile communication systems. It uses standardized communications protocols to allow fixed line or mobile phone devices to exchange short text messages. SMS was originally designed as part of GSM, but is now available on a wide range of networks, including 3G, 4G, LTE, 5G networks or networks associated with the communication channel as defined herein. In other aspects, text message may include Multimedia Messaging Service (MMS), which is a standard way to send messages that include multimedia content to and from mobile phones. It extends the core SMS (Short Message Service) capability that allowed exchange of text messages only up to 160 characters in length. While the most popular use is to send photographs from camera-equipped handsets, it is also used as a method of delivering news and entertainment content including videos, pictures, text pages, and ringtones. MMS can be used within the context of the disclosure for UICC activation message delivery. Of note is that MMS messages are delivered in a completely different way from SMS. The first step is for the sending device to encode the multimedia content in a fashion similar to sending a MIME e-mail (MIME content formats are defined in the MMS Message Encapsulation specification). The message is then forwarded to the carrier's MMS store and forward server, known as the MMSC (Multimedia Messaging Service Centre). If the receiver is on another carrier, the relay forwards the message to the recipient's carrier using the Internet.

The term talk, voice, or voice calls as utilized herein may include voice calls defined by 3GPP (3rd Generation Partnership Project) with Voice Call Continuity (VCC) specifications in order to describe how a voice call can be persisted, as a mobile phone moves between circuit switched and packet switched radio domains (3GPP TS 23.206).

The term data as utilized herein includes mobile broadband or wireless Internet access delivered through mobile phone towers over a communication channel as defined herein to computers, mobile phones, wireless devices, and other digital devices as defined herein using portable modems. Some mobile services allow more than one device to be connected to the Internet using a single cellular connection using a process called tethering.

As used herein interactive voice response (IVR) is a technology that allows a computer to interact with humans through the use of voice and DTMF tones input via keypad. In telecommunications, IVR allows customers to interact with a company's host system via a telephone keypad or by voice recognition, after which they can service their own inquiries by following the IVR dialogue. IVR systems can respond with prerecorded or dynamically generated audio to further direct users on how to proceed. IVR applications can be used to control almost any function where the interface can be broken down into a series of simple interactions. IVR systems deployed in the network are sized to handle large call volumes.

Voice recognition software may be utilized in various aspects of the systems and methods. Users may be able to vocalize, rather than utilizing other input processes. For example, the voice recognition software may be configured for generating text from voice input from a microphone or other voice input. A speech signal processor may convert speech signals into digital data that can be processed by the processor. The processor may perform several distinct functions, including serving as the speech event analyzer, the dictation event subsystem, the text event subsystem, and the executor of the application program. The speech signal processor may generate speech event data and transmit this data to the processor to be processed first by the speech event analyzer. The speech event analyzer may generate a list or set of possible candidates among the system recordings that represent or match the voice input processed by the speech signal processor. The speech event analyzer may transmit the candidate sets to a dictation event subsystem. The dictation event subsystem may analyze the candidate sets and choose the best match candidate with the highest degree of similarity. This candidate is then considered the correct translation, and the dictation event subsystem forwards the translation to the text event subsystem, which in turn inputs the translated text into the device.

While the device, system, and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A wireless service provider system configured to change wireless carrier networks for one or more wireless devices, the wireless service provider system comprising:
   a database configured to store current wireless carrier network distribution information for the one or more wireless devices;
   the database further configured to store charge rates for a current wireless carrier network distribution of the one or more wireless devices; and
   a processor configured to:
      access the database to obtain (i) the current wireless carrier network distribution information and (ii) the charge rates for the current wireless carrier network distribution, for the one or more wireless devices;
      analyze the current wireless carrier network distribution information for the one or more wireless devices and the charge rates for the current wireless carrier network distribution of the one or more wireless devices to determine a change in distribution of wireless networks for the one or more wireless devices;
      transmit a notification to the one or more wireless devices, the notification (i) being respectively displayed thereon and (ii) seeking authorization to change from a first Mobile Network Operator (MNO) wireless carrier network to a second MNO wireless carrier network;
      receive a response to the notification from the one or more wireless devices, each response respectively providing the authorization to change from the first MNO wireless carrier network to the second MNO wireless carrier network;
      send a command, which includes at least one profile, to modify network settings of a subscriber identity module (SIM) of each of the one or more wireless devices to change from the first MNO wireless carrier network to the second MNO wireless carrier network, the network settings comprising information used to authenticate and identify at least one wireless user on the second MNO wireless carrier network, wherein the at least one profile is different from the network settings and includes a location for each of the one or more wireless devices;
      analyze the current wireless carrier network distribution information for the one or more wireless devices and the charge rates for the current wireless carrier network distribution of the one or more wireless devices to determine a future cost by one of the following: (i) simulating a modified network distribution to determine a future cost;
determine whether to modify the current wireless carrier network distribution by implementing at least one of a simulation or optimization algorithm; and
responsive to the determination indicating at least one advantage, perform the modification of the current wireless carrier network distribution based on the determined future cost and an analysis of surplus wireless service information;
the wireless service provider system being implemented by a Mobile Virtual Network Operator (MVNO); and
the one or more wireless devices connecting to the second MNO wireless carrier network responsive to reception of the at least one profile and to the respective modification(s) of the respective network settings.

2. The wireless service provider system of claim 1, wherein:
the notification comprises at least one of the following: a graphical user interface comprising one or more interactive graphical user interface buttons configured to receive a response from a wireless user and a text message offering network modification configured to receive a reply to initiate modification of the network settings; and
the location of the one or more wireless devices comprises at least one geographic location.

3. The wireless service provider system of claim 1, wherein:
the command comprises an over the air command to the one or more wireless devices to modify the wireless carrier network settings for the one or more wireless devices;
the current wireless carrier network distribution information for the one or more wireless devices further comprises a historical type of wireless service used for each of the one or more wireless devices;
the current wireless carrier network distribution information for the one or more wireless devices further comprises a wireless device type for each of the one or more wireless devices;
the processor further configured to analyze the current wireless carrier network distribution information for the one or more wireless devices including the historical type of wireless service used and the wireless device type for each of the one or more wireless devices to determine a change in distribution of wireless networks for the one or more wireless devices; and
the location of the one or more wireless devices comprises at least one geographic location.

4. The system of claim 1, wherein:
the command comprises an over the air command to the one or more wireless devices that includes new network settings to modify the wireless carrier network settings for the one or more wireless devices;
the current wireless carrier network distribution information for the one or more wireless devices further comprises a historical type of wireless service used for each of the one or more wireless devices;
the current wireless carrier network distribution information for the one or more wireless devices further comprises a wireless device type for each of the one or more wireless devices;
the processor further configured to analyze the current wireless carrier network distribution information for the one or more wireless devices including the historical type of wireless service used and the wireless device type for each of the one or more wireless devices to determine a change in distribution of wireless networks for the one or more wireless devices;
the notification comprising one or more interactive graphical user interface buttons configured to receive a response from the at least one wireless user; and
the location of the one or more wireless devices comprises at least one geographic location.

5. The wireless service provider system of claim 1, further comprising:
at least one wireless device application configured to generate a graphical user interface on a display of the at least one wireless device to display the notification and the notification comprising one or more interactive graphical user interface buttons configured to receive a response from a wireless user;
the wireless transceiver further configured to receive the command from the processor to modify network settings;
the at least one wireless device application configured to modify network settings in response to the command received from the processor;
the at least one wireless device further including a wireless processor being configured to execute the at least one wireless device application to modify network settings in response to the command received from the processor; and
the location of the one or more wireless devices comprises at least one geographic location.

6. The wireless service provider system of claim 1, wherein:
the one or more wireless devices are configured to connect to one of a plurality of wireless networks;
the current wireless carrier network distribution information for the one or more wireless devices further comprises a historical type of wireless service used for each of the one or more wireless devices;
the current wireless carrier network distribution information for the one or more wireless devices further comprises a wireless device type for each of the one or more wireless devices; and
the processor further configured to analyze the current wireless carrier network distribution information for the one or more wireless devices including the historical type of wireless service used and the wireless device type for each of the one or more wireless devices to determine a change in distribution of wireless networks for the one or more wireless devices.

7. The wireless service provider system of claim 1, wherein:
the current wireless carrier network distribution information for the one or more wireless devices further comprises a wireless device type for each of the one or more wireless devices;
and
the location of the one or more wireless devices comprises at least one geographic location.

8. A wireless service provider process for changing wireless carrier networks for one or more wireless devices, the process comprising:
storing in a database current wireless carrier network distribution information for the one or more wireless devices;
storing in the database charge rates for a current wireless carrier network distribution of the one or more wireless devices;

accessing with a processor the database to obtain (i) the current wireless carrier network distribution information and (ii) the charge rates for the current wireless carrier network distribution, for the one or more wireless devices;

transmitting with the processor a notification to the one or more wireless devices, the notification (i) being respectively displayed thereon and (ii) seeking authorization to change from a first MNO wireless carrier network to a second MNO wireless carrier network;

receiving with the processor a response to the notification from the one or more wireless devices, each response respectively providing the authorization to change from the first MNO wireless carrier network to the second MNO wireless carrier network; and sending with the processor a command, which includes at least one profile, to modify network settings of a SIM of each of the one or more wireless devices to change from the first MNO wireless carrier network to the second MNO wireless carrier network, wherein the at least one profile is different from the network settings and includes a location for each of the one or more wireless devices;

analyzing with the processor the current wireless carrier network distribution information for the one or more wireless devices and the charge rates for the current wireless carrier network distribution of the one or more wireless devices to determine a future cost by one of the following: (i) simulating a modified network distribution to determine a future cost;

determining whether to modify the current wireless carrier network distribution by implementing at least one of a simulation or optimization algorithm;

responsive to the determination indicating at least one advantage, performing the modification of the current wireless carrier network distribution based on the determined future cost and an analysis of surplus wireless service information; and providing a system of an MVNO to implement the process, wherein the one or more wireless devices connect to the second MNO wireless carrier network responsive to reception of the at least one profile and to the respective modification(s) of the respective network settings.

9. The wireless service provider process of claim 8, wherein:

the notification comprises at least one of the following: a graphical user interface comprising one or more interactive graphical user interface buttons configured to receive a response from a wireless user and a text message offering network modification configured to receive a reply to initiate modification of the network settings; and the location of the one or more wireless devices comprises at least one geographic location.

10. The wireless service provider process of claim 8, wherein:

the command comprises an over the air command to the one or more wireless devices to modify the wireless carrier network settings for the one or more of the plurality of wireless devices;

the current wireless carrier network distribution information for the one or more wireless devices further comprises a historical type of wireless service used for each of the one or more wireless devices;

the current wireless carrier network distribution information for the one or more wireless devices further comprises a wireless device type for each of the one or more wireless devices;

the process further comprising analyzing with the processor the current wireless carrier network distribution information for the one or more wireless devices including the historical type of wireless service used and the wireless device type for each of the one or more wireless devices to determine a change in distribution of wireless networks for the one or more wireless devices;

the notification comprising one or more interactive graphical user interface buttons configured to receive a response from a wireless user; and the location of the one or more wireless devices comprises at least one geographic location.

11. The wireless service provider process of claim 8, wherein:

the command comprises an over the air command to the one or more wireless devices that includes new network settings to modify the wireless carrier network settings for the one or more wireless devices;

the current wireless carrier network distribution information for the one or more wireless devices further comprises a historical type of wireless service used for each of the one or more wireless devices;

the current wireless carrier network distribution information for the one or more wireless devices further comprises a wireless device type for each of the one or more wireless devices;

the notification comprising one or more interactive graphical user interface buttons configured to receive a response from a wireless user; and the processor is further configured to analyze the current wireless carrier network distribution information for the one or more wireless devices including the historical type of wireless service used and the wireless device type for each of the one or more wireless devices to determine a change in distribution of wireless networks for the one or more wireless devices.

12. The wireless service provider process of claim 8, further comprising:

generating a graphical user interface on a display of the at least one wireless device to display the notification in response to at least one wireless device application and the notification comprising one or more interactive graphical user interface buttons configured to receive a response from a wireless user;

receiving the command with the wireless transceiver from the processor to modify network settings; and providing the at least one wireless device further including a wireless processor being configured to modify network settings in response to the command received from the processor.

13. The wireless service provider process of claim 8, wherein:

the one or more wireless devices are configured to connect to one of a plurality of wireless networks;

the current wireless carrier network distribution information for the one or more wireless devices further comprises a historical type of wireless service used for each of the one or more wireless devices;

the current wireless carrier network distribution information for the one or more wireless devices further comprises a wireless device type for each of the one or more wireless devices;

the processor is further configured to analyze the current wireless carrier network distribution information for the one or more wireless devices including the historical type of wireless service used and the wireless device type for each of the one or more wireless devices to determine a change in distribution of wireless networks for the one or more wireless devices; and the location of the plurality of wireless devices comprises at least one geographic location.

14. A wireless service provider system configured to change wireless carrier networks for one or more wireless devices, the wireless service provider system comprising:

a database configured to store current wireless carrier network distribution information for the one or more wireless devices;

the database further configured to store charge rates for a current wireless carrier network distribution of the one or more wireless devices;

a processor configured to access the database to obtain (i) the current wireless carrier network distribution information and (ii) the charge rates for the current wireless carrier network distribution, for the one or more wireless devices;

the processor further configured to analyze the current wireless carrier network distribution information for the one or more wireless devices and the charge rates for the current wireless carrier network distribution of the one or more wireless devices to determine a future cost;

the processor further configured to determine whether to modify the current wireless carrier network distribution by implementing at least one of a simulation or optimization algorithm;

the processor further configured to perform the modification of the current wireless carrier network distribution based on the determined future cost and an analysis of surplus wireless service information, responsive to the determination indicating at least one advantage;

the processor further configured to transmit a notification to the one or more wireless devices, the notification (i) being respectively displayed thereon and (ii) seeking authorization to change from a first MNO wireless carrier network to a second MNO wireless carrier network;

the processor further configured to receive a response to the notification from the one or more wireless devices, each response respectively providing the authorization to change from the first MNO wireless carrier network to the second MNO wireless carrier network; and the processor further configured to send a command, which includes at least one profile, to the one or more wireless devices to modify network settings of a SIM of the one or more wireless devices to change from the first MNO wireless carrier network to the second MNO wireless carrier network, wherein the at least one profile is different from the network settings and includes a location for each of the one or more wireless devices;

the wireless service provider system is implemented by a Mobile Virtual Network Operator;

the notification comprises at least one of the following: a graphical user interface comprising one or more interactive graphical user interface buttons configured to receive a response from a wireless user and a text message offering network modification configured to receive a reply to initiate modification of the network settings; and the one or more wireless devices connect to the second MNO wireless carrier network responsive to reception of the at least one profile and to the respective modification(s) of the respective network settings.

15. The wireless service provider system of claim 14, wherein:

the command comprises an over the air command to the one or more wireless devices to modify the wireless carrier network settings for the one or more wireless devices;

the current wireless carrier network distribution information for the one or more wireless devices further comprises a wireless device type for each of the one or more wireless devices;

the processor further configured to analyze the current wireless carrier network distribution information for the one or more wireless devices including the wireless device type for each of the one or more wireless devices to determine a change in distribution of wireless networks for the one or more wireless devices; and the location of the plurality of wireless devices comprises at least one geographic location.

16. The wireless service provider system of claim 14, wherein:

the command comprises an over the air command to the one or more wireless devices that includes new network settings to modify the wireless carrier network settings for the one or more wireless devices; and the current wireless carrier network distribution information for the one or more wireless devices further comprises a wireless device type for each of the one or more wireless devices.

17. The wireless service provider system of claim 14, wherein:

the location of the one or more wireless devices comprises at least one geographic location.

* * * * *